United States Patent

Shimizu et al.

[11] Patent Number: 6,162,539
[45] Date of Patent: *Dec. 19, 2000

[54] HIGH LUMINANCE LUMINOUS FIBER AND PROCESS FOR PRODUCING THE SAME

[75] Inventors: Yoshishige Shimizu; Ken Ogasawara; Hideo Sakakura, all of Toyohashi; Atsushi Ogura; Daiji Goto, both of Fuchu, all of Japan

[73] Assignees: Mitsubishi Rayon Co., Ltd., Tokyo; Chemitech, Inc. Ltd., Fuchu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/379,110

[22] Filed: Aug. 23, 1999

[30] Foreign Application Priority Data

Aug. 26, 1998 [JP] Japan .................. 10-254651

[51] Int. Cl.$^7$ ........................................ D02G 3/00
[52] U.S. Cl. ................. 428/373; 428/370; 264/172.15
[58] Field of Search ........................... 428/370, 373, 428/374; 252/301.36, 301.4 R; 264/172.15

[56] References Cited

U.S. PATENT DOCUMENTS

| | | | |
|---|---|---|---|
| 5,674,437 | 10/1997 | Geisel | 264/21 |
| 5,853,614 | 12/1998 | Hao et al. | 252/301.4 R |
| 5,914,076 | 6/1999 | Schloss | 261/21 |
| 5,989,135 | 11/1999 | Welch | 473/353 |

FOREIGN PATENT DOCUMENTS

| | | |
|---|---|---|
| 7-300722 | 11/1995 | Japan . |
| 9-143464 | 6/1997 | Japan . |
| 9-228149 | 9/1997 | Japan . |
| 10-231480 | 9/1998 | Japan . |

*Primary Examiner*—N Edwards
*Attorney, Agent, or Firm*—Oblon, Spivak, McClelland, Maier & Neustadt, P.C.

[57] ABSTRACT

A luminous fiber described below, which does not exert a harmful effect on human bodies and is capable of emitting light for a long period of time with a high luminance, and a process for producing the luminous fiber are provided.

A high luminance luminous fiber comprising a core component containing a polyolefin resin and 10–60% by weight, relative to the core component, of a luminous pigment comprising sintered fine powders represented by the formula of $$(M_{0.9995-0.998}Eu_{0.0005-0.002})Al_2O_4 \cdot (M_{0.9995-0.998}Eu_{0.0005-0.002})O \cdot n(Al_{1-b-a}B_bQ_a)_2O_3,$$

wherein M represents at least one element selected from the group consisting of Sr, Ca, Mg and Ba, Q represents at least one element selected from the group consisting of Y, lanthanoid elements, Mn and Bi, a is 0.0005–0.002, b is 0.001–0.35 and n is an integer of 1–8, and a sheath component comprising a polyolefin resin containing no luminous pigment.

10 Claims, No Drawings

HIGH LUMINANCE LUMINOUS FIBER AND PROCESS FOR PRODUCING THE SAME

FIELD OF THE INVENTION

The present invention relates to a high luminance luminous fiber suitable for a variety of uses, e.g.; for knitted and woven goods, carpets and braids having luminousness as the decorative feature; knitted and woven goods and braids for traffic safety using their luminous function and further artificial hooks for fly fishing, and to a process for producing the fiber.

BACKGROUND OF THE INVENTION

Up to now, various fibers have been colored with various materials to impart a wide variety of color effect to the fibers. In recent years, particularly, attempts have been made to impart to fibers a high degree of value added by the use of various functional coloring materials as a coloring material. One of the products by such attempts is a fiber which contains a luminescent coloring material called a luminous pigment or a luminescent pigment.

JP-A-49-47646 and JP-B-3-70020 disclose luminescent textile products using, as the luminescent coloring material, a luminescent pigment comprising activated various metals with sulfides as main components. JP-A-2-112414 discloses a conjugated luminescent fiber comprising mainly zinc sulfide. However, these luminescence-emitting fibers disclosed as above exhibit only a low luminance and show a very short emission time of about 5 minutes. On the other hand, it is known that an addition of radioactive substances to such luminescent pigments improves their luminescent function, but the use of pigments containing radioactive substances in such daily used materials as fibers should be avoided in view of their adverse effect on human bodies.

JP-A-7-300722 discloses that a luminous pigment having a structure comprising metal oxides doped with rare earth elements can emit light for a long period of time with a high luminance although it substantially contains no radioactive substance. However, this fiber employs, as a thermoplastic resin used in a sheath component, hydrophilic polymers such as nylon-6, nylon-66, poly(ethylene terephthalate) and poly(butylene terephthalate), such that a luminous performance of the luminous pigment used is lowered due to a moisture contained in the resin.

In view of the above-mentioned problems, the object of the present invention is to provide a luminous fiber which can be used also for industrial materials, does not affect adversely on human bodies, and can emit light for a long period of time with a high luminance and in multiple colors, and a process for producing the fiber.

SUMMARY OF THE INVENTION

The present inventors have made extensive study to achieve the above-mentioned object and resultantly attained the present invention.

The present invention relates to a high luminance luminous fiber comprising:

a core component containing a polyolefin resin and 10–60% by weight, relative to the core component, of a luminous pigment comprising sintered fine powders represented by the formula of

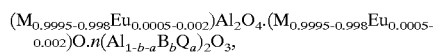

$(M_{0.9995-0.998}Eu_{0.0005-0.002})Al_2O_4 \cdot (M_{0.9995-0.998}Eu_{0.0005-0.002})O \cdot n(Al_{1-b-a}B_bQ_a)_2O_3$, wherein M represents at least one element selected from the group consisting of Sr, Ca, Mg and Ba; Q represents at least one element selected from the group consisting of La, Ce, Pr, Nd, Sm, Gd, Tb, Dy, Ho, Er, Tm, Yb, Y, Lu, Mn and Bi; a falls within the range of 0.0005–0.002, b falls within the range of 0.001–0.35; and n is an integer of 1–8, and a sheath component comprising a polyolefin resin containing no luminous pigment.

Additionally, the present invention relates to a process for producing a high luminance luminous fiber comprising the steps of:

providing, as a core component, a composition containing a polyolefin resin and 10–60% by weight, relative to the core component, of a luminous pigment comprising sintered fine powders represented by the above formula;

providing, as a sheath component, a polyolefin resin containing no luminous pigment; and conjugate spinning the core component and the sheath component.

DETAILED DESCRIPTION OF THE INVENTION

The luminous pigment comprising the sintered fine powders represented by the above formula used in the present invention exhibits the better luminous performances (higher luminance and longer time emission) as its average particle diameter is the larger, but it has an average particle diameter falling within the range of preferably 1–20 μm, more preferably 4–8 μm, from the viewpoints of the fiber-forming property and physical properties of luminous fiber obtained. The use of a luminous pigment having an average particle diameter larger than 20 μm tends to deteriorate the fiber-forming property (fiber-forming stability), to decrease a fiber strength of the luminous fiber obtained, to lower a post-processability and to decrease a strength of luminous textile goods obtained. When the average particle diameter is less than 1 μm, a resulting fiber tends to substantially exhibit no luminescent performance and hence tends to hardly serve as a luminous fiber.

The core component constituting the high luminance luminous fiber of the present invention contains 10–60% by weight of the above-mentioned luminous pigment and contains a polyolefin resin.

When a luminous fiber is prepared by a method which comprises kneading a luminous pigment directly into a fiber, the content of the luminous pigment is preferably 5% by weight or less. When the content exceeds 5% by weight, a fiber-forming property tends to deteriorate and a fiber strength of the resulting luminous fiber also tends to decrease. Further, the moisture present in the circumference of the fiber tends to react with the luminous pigment to cause the discoloration of the pigment and the deterioration of luminous performances. Moreover, it has been revealed that such phenomena shift gradually from the surface to the inside of the fiber with the luminous pigment exposing itself on the fiber surface acting as a trigger.

Accordingly, the present invention provides a high luminance luminous fiber comprising a core-sheath type conjugated structure comprising a polyolefin resin containing a luminous pigment as the core component and a polyolefin resin having a high transparency as the sheath component.

The ratio of the core to the sheath in the conjugated fiber constituting the high luminance luminous fiber of the present invention is preferably in the range of from 1:3 to 1:1 by volume in terms of core sheath ratio from the viewpoint of fiber-forming property and the physical property of the fiber. With regard to the content of luminous pigment in the conjugated fiber, although the luminescent performance improves as the content increases, the content in the whole fibers is preferably in the range of 5–20% by weight from the viewpoint of the fiber-forming property and the physical property of the high luminance luminous fiber obtained. When the core to sheath ratio is less than 1:3, section unevenness tends to develop at the core part constituting the conjugated fiber to deteriorate the fiber-forming property. When the core to sheath ratio exceeds 1:1, the fiber strength of the resulting luminous fiber tends to decrease to cause the deterioration of the fiber-forming property and of a processability of knitting or wearing (a post-processability). In the present invention, therefore, it is necessary to incorporate a high concentration of the luminous pigment into the core component thereby to attain a volume ratio which does not cause the decrease of the strength of the conjugated fiber obtained. With regard to the content of the luminous pigment, when the content is less than 5% by weight in the whole fibers, the luminescent intensity tends to be low and the emission time tends to be short. When the content is higher than 20% by weight, the stability in fiber forming tends to lower even with a core-sheath structure.

In the high luminance luminous fiber according to the present invention, a luminescent color from the high luminance luminous fiber is, for example, green having an emission wavelength of 515–525 nm, blue having an emission wavelength of 485–495 nm, violet having an emission wavelength of 420–440 nm, or yellow having an emission wavelength of 560–580 nm.

The luminous pigment used in the present invention comprises sintered fine powders represented by the formula shown above. When the pigment is irradiated with ultraviolet light and/or visible light of 200–450 nm at room temperature and then the ultraviolet light and/or visible light is cut off, the pigment emits light of various colors, preferably green, blue, violet or yellow, with a high luminance. In the above-mentioned formula, the numerals attached to M and Eu are mole numbers representing the proportions of the respective elements contents. In the above-mentioned formula, Eu should be in the range of 0.0005–0.002 mole. When it is larger than 0.002 mol, the concentration extinction phenomenon tends to occur to cause disappearance of luminousness. When it is smaller than 0.0005 mole, the number of luminous centers tends to be insufficient to result in weak luminousness.

In the above-mentioned formula, M is in the range of 0.9995–0.998 mole. M is at least one element selected from the group consisting of Sr, Ca, Mg and Ba, preferably selected from Sr and Ca. In the M—Eu—Al oxide and the M—Eu oxide in the above-mentioned formula, the kind of M and the proportions of M and Eu contained may be the same as or different from each other between the two oxides.

In the above-mentioned formula, Q represents at least one element selected from the group consisting of La, Ce, Pr, Nd, Sm, Gd, Tb, Dy, Ho, Er, Tm, Yb, Y, Lu, Mn and Bi and is preferably selected from Nd and Dy.

In the above-mentioned formula, a is in the range of 0.0005–0.002, b is in the range of 0.001–0.35 and n is an integer of 1–8. Preferably n is an integer of 1 or 2.

Examples of the luminous pigment comprising the sintered fine powders represented by the above-mentioned formula include;

Picariko CP-05 (a trade name) which emits green light: $(Sr_{0.9995}Eu_{0.0005})Al_2O_4 \cdot (Sr_{0.9995}Eu_{0.0005})O \cdot (Al_{1-0.01-0.0005}B_{0.01}Dy_{0.0005})_2O_3$;

Picariko CP-10 (a trade name) which emits blue light: $(Sr_{0.9995}Eu_{0.0005})Al_2O_4 \cdot (Sr_{0.9995}Eu_{0.0005})O \cdot 2(Al_{1-0.01-0.0005}B_{0.01}Dy_{0.0005})_2O_3$;

Picariko CP-20 (a trade name) which emits violet light: $(Sr_{0.09992}Ca_{0.89928}Eu_{0.0008})Al_2O_4 \cdot (Sr_{0.09992}Ca_{0.89928}Eu_{0.0008})O \cdot (Al_{1-0.01-0.0016}B_{0.01}Dy_{0.0008}Nd_{0.0008})_2O_3$; and Picariko CP-30 (a trade name) which emits yellow light: $Sr_{0.7996}Ca_{0.1999}Eu_{0.0005})Al_2O_4 \cdot (Sr_{0.7996}Ca_{0.1999}Eu_{0.0005})O \cdot (Al_{1-0.02-0.002}B_{0.02}Dy_{0.002})_2O_3$;

respectively after cut-off of ultraviolet light and/or visible light. These pigments are all made by Chemitech Inc., Ltd. and are commercially available under the above-mentioned trade names.

The thermoplastic resin used for the core component as one of the constituents of the high luminance luminous conjugated fiber of the present invention is preferably a polyolefin resin because of its good fiber-forming property and other reasons. The resin used for the sheath component is preferably one which has a moisture content of substantially 0. Particularly preferably used for this purpose are polyolefin resins, which are also preferred from the viewpoint of heat resistance, etc. Though the polyolefin resins used for the core component and the sheath component are not particularly limited, in consideration of the heat resistance and strength of the fiber, those which have a relatively high melting point among polyolefin resins are preferred, polypropylene resins being particularly preferred. The polypropylene resin used may be, besides propylene homopolymer, copolymers of propylene and at least one other α-olefin monomer, such as ethylene, butene-1, pentene-1, hexene-1, octene-1 and decene-1, but it is preferably one which can be molten. The kind of the polyolefin resin and properties thereof used for the core component and the sheath component may be the same as or different from each other between the two components.

In the present invention, a wax may be incorporated into the core component in order to improve the dispersion of the luminous pigment in the core component. Examples of the waxes which can be used include paraffin wax, microcrystalline wax, montan wax, polyethylene wax, polypropylene wax, polystyrene wax, low molecular weight polybutene, liquid polybutadiene, liquid polypentadiene, oligo ester acrylate, polyamide oligomer, polyester oligomer and silicone oligomer. These waxes may be incorporated into the core component in a proportion of from 0 to 20% by weight.

The luminous pigment comprising the sintered fine powders represented by the above-mentioned formula may be either added directly to the polyolefin resin constituting the core component or added to a resin for color master batches at the time of preparing color master batches. When a color master batch is prepared, first, for example, a polyolefin resin master batch containing 60% by weight or less of the above-mentioned luminous pigment is prepared, which is thereafter diluted with polyolefin resin. The master batch can be used by diluting it with polyolefin resin in any proportions or can be used as it is, for preparing the core component.

The high luminance luminous fiber of the present invention is in general produced by the method of conjugate spinning. From the viewpoint of the stability in fiber forming, the polypropylene resins used for the core component and for the sheath component are both preferably those which have a melt flow rate (according to JIS-K-7210, measuring conditions: temperature 230° C., load 2.16 kg; hereinafter abbreviated as MFR value) in the range of 5–50 g/10 min. When the MFR value is less than 5 g/10 min, the fiber tends to whiten at the time of fiber formation, and the luminous property of the fiber obtained tends to deteriorate. When the value is more than 50 g/10 min. the fiber-forming property tends to deteriorate.

The core component constituting the high luminance luminous fiber of the present invention may be formed by melting a polyolefin resin and then mixing and dispersing thereinto a luminous pigment comprising the sintered fine powders represented by the above-mentioned formula and having an average particle diameter of 1–20 μm in the range of amount of 10–60% by weight relative to the core component. The dispersion of the luminous pigment in the core component resin can be further improved when the luminous pigment is used in the form of color master batch obtained by preliminarily dispersing the pigment in the molten polyolefin resin. The resins which can be used for such color master batches may be polypropylene resins similar to those used for the sheath component. The MFR value of the resin for color master batches is preferably of the same magnitude as that of the polypropylene resin used for the sheath component from the viewpoint of the fiber-forming stability. The luminous fiber of the present invention is preferably produced by conjugate spinning using a polypropylene resin containing the luminous pigment as the core component and a polypropylene resin containing no luminous pigment as the sheath component, the volume ratio of the core component to the sheath component being selected from the range of 1:3 to 1:1. The means for spinning is not particularly limited; the spinning may be conducted by using conventional conjugate spinning equipment.

The conjugated fiber thus obtained may be drawn under the conditions of a draw ratio of 2–5, a drawing temperature of 60–110° C., preferably 60–105° C., and a heat set temperature of 90–150° C., preferably 90–135° C., to yield the high luminance luminous fiber. When the draw ratio is less than 2, the strength of the fiber produced tends to be low; when it exceeds 5, the fiber-forming stability tends to be low. When the drawing temperature is lower than 60° C., the draw ratio should be set at a low value, and resultantly the strength of the fiber tends to be low and the fiber-forming stability also tends to be low. When the drawing temperature is higher than 110° C., the fiber-forming stability tends to be low. When the heat set temperature is lower than 90° C., after the fiber is processed into final products used as materials which require luminousness, the fiber tends to develop shrinkage, resulting in poor dimensional stability and deformation of the product. When the temperature is higher than 150° C., the fiber-forming stability tends to be low.

A similar high luminance luminous fiber may also be obtained by conducting the spinning and drawing in consecutive one process (namely, by so-called one-step fiber-forming method).

The fully oriented fiber may be successively subjected to a draw-stuffer jet crimper process under the conditions of a heat treating temperature of 110–150° C. and a relaxation percentage of 20% or more to yield a high luminance luminous crimped fiber. When the heat treating temperature in the draw-stuffer jet crimper process is lower than 110° C., the crimp tends to develop insufficiently and the crimped fiber tends to be difficult to obtain. When the heat treating temperature is higher than 150° C., the fiber-forming stability tends to be low. When the relaxation percentage is less than 20%, the crimp tends to develop insufficiently and the crimped fiber tends to be difficult to obtain.

The cross-section of the high luminance luminous fiber of the present invention may be of various kinds of shapes, such as a circle and triangle, and also a hollow section, so long as the fiber is of a core-sheath structure. The fineness of the fiber is not particularly limited and may be any desired one.

EXAMPLES

The present invention is described in detail below with reference to Examples.

The luminous property of the fibers obtained in Examples and Comparative Examples was evaluated by the afterglow luminance test. The test method is as follows.

(1) The fiber is taken up uniformly on a white board (thickness of fiber layer: not less than 5 mm).
(2) The sample taken up on the board is cut off from light for 5 hours.
(3) The sample taken up on the board is placed horizontally 60 cm below a 27 W table fluorescent lamp (about 1,000 lux) and irradiated for 30 minutes to cause excitation.
(4) After the stop of irradiation, the afterglow luminance is measured by using a TOPCON BM-8 luminance meter (a trade name, mfd. by TOPCON INC.).

Example 1

First, 40% by weight of a polypropylene resin with an MFR value of 5 g/10 min. and 60% by weight of a luminous pigment having an average particle diameters of 5–6 μm comprising sintered fine powders represented by the above-mentioned formula (Picariko CP-05, a trade name, mfd. by Chemitech Inc., Ltd.) were melt-blended and formed into pellet to obtain a color pellet (master batch, hereinafter abbreviated as MB). A material obtained by pellet-blending 1 part by weight of the MB and 2.5 parts by weight of a common polypropylene resin with an MFR value of 10 g/10 min. was used for the core component (the content of the luminous pigment in the core component was 17% by weight) and a common polypropylene with an MFR value of 10 g/10 min. was used as the sheath component, the core to sheath ratio (by volume) being 1:1. The two components were molten by using respective extruders, each controlled at the first zone temperature of 250° C. and the second-fourth zone temperatures of 260° C., at a spinning head temperature of 255° C., then formed into fiber through a conjugate spinning nozzle of circular-section core-sheath type and 1.0 mmφ×60 holes and the fiber was taken up at a take-up speed of 330 m/min. Further, the fiber was drawn at a drawing temperature of 90° C., a heat set temperature of 135° C. and a draw ratio of 3.3 to obtain a luminous fiber of 1100 dtex/60 filament (f).

The luminous fiber (yarn) obtained above had a luminous pigment content of 8.5% by weight/yarn. The fiber exhibited a good fiber-forming stability and showed no falling off of the luminous pigment at the time of drawing. The fiber had a function of emitting green light having (emission) wavelength of 518–520 nm for several hours when shifted from a light place to a dark place. The function and the physical property of the fiber did not change even after the lapse of 6 months from the fiber preparation. Table 1 shows the physical property of the fiber and Table 2 shows the result of determination of afterglow luminance.

Example 2

A luminous fiber of 1200 dtex/60f was prepared in the same manner as in Example 1 except that the material for the core component was changed to a material obtained by pellet-blending 1 part by weight of the MD and 1.6 parts by weight of the common polypropylene resin respectively used in Example 1 (the luminous pigment content in the core component was 23% by weight). The luminous fiber obtained had a luminous pigment content of 11.5% by weight/yarn. It showed a good fiber-forming property, and had a function of emitting green light of a higher luminance than that of the fiber obtained in Example 1 when shifted from a light place to a dark place. Table 1 shows the physical property of the fiber and Table 2 shows the result of determination of afterglow luminance.

Example 3

A luminous fiber of 1200 dtex/60f was prepared in the same manner as in Example 1 except that the material for the core component was changed to a material obtained by pellet-blending 1 part by weight of the MB and 1 part by weight of the common polypropylene resin respectively used in Example 1 (the luminous pigment content in the core component was 30% by weight). The luminous fiber obtained had a luminous pigment content of 15% by weight/yarn. The fiber showed a good fiber-forming property and had a function of emitting green light of a higher luminance than that of the fiber obtained in Example 2 when shifted from a light place to a dark place. Table 1 shows the physical property of the fiber and Table 2 shows the result of determination of afterglow luminance.

Example 4

The undrawn fiber obtained in Example 2 was drawn at a drawing temperature of 105° C., a heat set temperature of 125° C. and a draw ratio of 3.3 and successively subjected to a draw-stuffer jet crimper process under conditions of a hot air temperature of 135° C. and a relaxation percentage of 30% to yield a luminous crimped fiber of 1200 dtex/60f. The fiber showed a good fiber-forming property and had a function of emitting a high luminance green light when shifted from a light place to a dark place. Table 1 shows the physical property of the fiber and Table 2 shows the result of determination of afterglow luminance.

Example 5

A luminous fiber of 1600 dtex/60f was prepared in the same manner as in Example 1 using the common polypropylene resin as the sheath component except that the MB used in Example 1 was used as the core component (the content of the luminous pigment in the core component was 60% by weight) and the core to sheath ratio was changed to 1:2. The luminous fiber obtained had a luminous pigment content of 20% by weight/yarn. The fiber showed a good fiber-forming property and had a function of emitting a green light of a higher luminance than that of the fiber obtained in Example 3 when shifted from a light place to a dark place. Table 1 shows the physical property of the fiber and Table 2 shows the result of determination of afterglow luminance.

Example 6

A luminous fiber of 1100 dtex/60f was prepared in the same manner as in Example 1 except that the luminous pigment used in Example 1 was changed to Picariko CP-10 (a trade name, a luminous pigment having an average particle diameters of 5–6 $\mu$m comprising the sintered fine powders represented by the above-mentioned formula, mfd. by Chemitech Inc., Ltd.) and the content of the luminous pigment in the core component was changed to 17% by weight. The luminous fiber obtained had a luminous pigment content of 8.5% by weight/yarn. The fiber showed a good fiber-forming property and had a function of emitting a blue light having a wavelength of 488–490 nm of approximately the same luminance as that of the fiber obtained in Example 1 when shifted from a light place to a dark place. Table 1 shows the physical property of the fiber and Table 2 shows the result of determination of afterglow luminance.

Comparative Example 1

By using an extruder of single structure controlled at the first zone temperature of 250° C. and at the second-fourth zone temperatures of 260° C., a pellet blend of 1 part by weight of the MB used in Example 1 and 11 parts by weight of a common polypropylene resin with an MFR value of 10 g/10 min. was molten and formed into fiber at a spinning head temperature of 255° C., and the fiber was taken up at a take-up speed of 330 m/min. Further, a drawing of the fiber was tried at a drawing temperature of 90° C., a heat set temperature of 135° C. and a draw ratio of 2.5, but the fiber showed a very poor fiber-forming stability. The fiber-forming stability was not improved even when the draw ratio was changed to 2.0. The luminous pigment content in the fiber was 5% by weight/yarn. Falling off of the luminous pigment occurred at the time of fiber formation. The fiber obtained had a low fiber strength and a poor luminous property, and was not worthy of the name of luminous fiber. Table 1 showed the physical property of the fiber.

Comparative Example 2

To prepare a MB of high concentration, 35% by weight of a polypropylene resin with an MFR value of 5 g/10 min. and 65% by weight of a luminous pigment with an average particle diameters of 5–6 $\mu$m were blended and melt-formed into a color pellet master batch. A strand in the preparation of MB was broken and thus a stability in the MB preparation was low. Fiber-forming was attempted in the same manner as in Example 1 by using a common polypropylene resin as the sheath component except that the high concentration MB obtained above was used as the core component (the luminous pigment content in the core component was 65% by weight) and the core to sheath ratio was changed to 1:3, but the combination of components showed no fiber-formability and luminous fiber was not able to be obtained. The fiber-forming property was not improved even when the draw ratio was changed to 2.5 and 2.0.

Comparative Example 3

Conjugate spinning was conducted in the same manner as in Example 1 except that the luminous pigment used was changed to zinc sulfide having particle diameters of not more than 30 $\mu$m and a resin incorporated with 23% by weight of the pigment was used as the core component. The undrawn fiber thus obtained was drawn at a draw ratio of 2.7. The content of zinc sulfide in the drawn fiber was 11.5% by weight/yarn. When the fiber thus obtained was shifted from a light place to a dark place, it emitted green light; but the fiber showed a poor luminous property (low luminance) and was not worthy of the name of luminous fiber. Table 1 shows the physical property of the fiber and Table 2 shows the result of determination of afterglow luminance.

Advantageous Effects of the Invention

The high luminance luminous fiber according to the present invention, which comprises a polypropylene resin containing a luminous pigment as the core component and a polypropylene resin containing no luminous pigment as the sheath component, the core to sheath ratio being selected from the range of 1:1 to 1:3, has, even when the core part contains a high concentration of luminous pigment, a sufficiently high fiber strength which does not cause problems even when the fiber is used for industrial materials and moreover has a function of emitting light for a long period of time with a high luminance though it contains substantially no radioactive substance. Accordingly, the fiber is suitable as a material for use in the field of industrial materials. Furthermore, the fiber can be used, as the material for knitted or woven goods, for knitted or woven goods and braids for traffic safety and further for artificial hooks for fly fishing and other like uses. Thus, the luminous fiber of the present invention is useful as a fiber material for use in a variety of fields including the field of industrial materials.

TABLE 1

|  | Fineness dtex | Tenacity Cn/dtex | Elongation % |
|---|---|---|---|
| Example 1 | 1100 | 3.03 | 53.2 |
| Example 2 | 1200 | 2.87 | 48.0 |
| Example 3 | 1200 | 2.53 | 43.3 |
| Example 4 | 1200 | 2.07 | 114.9 |
| Example 5 | 1600 | 1.76 | 37.7 |
| Example 6 | 1100 | 3.13 | 63.0 |
| Comparative Example 1 | 1100 | 1.14 | 27.8 |
| Comparative Example 3 | 1100 | 1.78 | 37.4 |

TABLE 2

| Time elapsed after stop of excitation | Afterglow luminance mcd/m$^2$ | | | | | | |
|---|---|---|---|---|---|---|---|
|  | Example 1 | Example 2 | Example 3 | Example 4 | Example 5 | Example 6 | Comparative Example 3 |
| 5 sec | 2890 | 4251 | 5526 | 6631 | 8890 | 3088 | 890 |
| 15 sec | 1820 | 2600 | 3380 | 4056 | 5640 | 1910 | 520 |
| 30 sec | 1190 | 1703 | 2214 | 2657 | 3800 | 1263 | 290 |
| 1 min | 740 | 1040 | 1352 | 1622 | 2410 | 768 | 170 |
| 2 min | 440 | 611 | 794 | 953 | 1480 | 462 | 98 |
| 3 min | 320 | 422 | 549 | 658 | 1100 | 340 | 78 |
| 4 min | 250 | 338 | 439 | 527 | 880 | 257 | 50 |
| 5 min | 200 | 273 | 354 | 425 | 740 | 221 | 30 |
| 6 min | 180 | 234 | 304 | 361 | 640 | 198 | 22 |
| 7 min | 150 | 208 | 270 | 324 | 560 | 163 | 11 |
| 8 min | 130 | 182 | 237 | 284 | 500 | 145 | 7 |
| 9 min | 120 | 156 | 203 | 244 | 450 | 138 | 3 |
| 10 min | 110 | 143 | 186 | 223 | 410 | 127 | 1 |
| 20 min | 60 | 78 | 101 | 121 | 200 | 67 | 0 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "mens for. . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A high luminance luminous fiber comprising:
   a core component containing a polyolefin resin and 10–60% by weight, relative to the core component, of a luminous pigment comprising sintered fine powders represented by the formula of

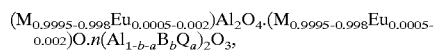
   $(M_{0.9995-0.998}Eu_{0.0005-0.002})Al_2O_4 \cdot (M_{0.9995-0.998}Eu_{0.0005-0.002})O \cdot n(Al_{1-b-a}B_bQ_a)_2O_3$, wherein M represents at least one element selected from the group consisting of Sr, Ca, Mg and Ba; Q represents at least one element selected from the group consisting of La, Ce, Pr, Nd, Sm, Gd, Tb, Dy, Ho, Er, Tm, Yb, Y, Lu, Mn and Bi; a falls within the range of 0.0005–0.002; b falls within the range of 0.001–0.35; and n is an integer of 1–8, and
   a sheath component comprising a polyolefin resin containing no luminous pigment.

2. The high luminance luminous fiber according to claim 1 wherein M represents strontium and/or calcium and Q represents dysprosium and/or neodymium.

3. The high luminance luminous fiber according to claim 1 wherein the volume ratio of the core component to the sheath component falls within the range of from 1:3 to 1:1.

4. The high luminance luminous fiber according to claim 1 wherein a luminescent color therefrom is green having an emission wavelength of 515–525 nm, blue having an emission wavelength of 485–495 nm, violet having an emission wavelength of 420–440 nm, or yellow having an emission wavelength of 560–580 nm.

5. The high luminance luminous fiber according to claim 1 wherein the luminous pigment has an average particle diameter falling within the range of 1–20 μm, preferably 4–8 μm.

6. The high luminance luminous fiber according to claim 1 wherein the formula is selected from the group consisting of:

$(Sr_{0.9995}Eu_{0.0005})Al_2O_4 \cdot (Sr_{0.9995}Eu_{0.0005})O \cdot (Al_{1-0.01-0.0005}B_{0.001}Dy_{0.0005})_2O_3$ which emits green light, $(Sr_{0.9995}Eu_{0.0005})Al_2O_4 \cdot (Sr_{0.9995}Eu_{0.0005})O \cdot 2(Al_{1-0.01-0.0005}B_{0.001}Dy_{0.0005})_2O_3$ which emits blue light, $(Sr_{0.09992}Ca_{0.89928}Eu_{0.0008})Al_2O_4 \cdot (Sr_{0.09992}Ca_{0.89928}Eu_{0.0008})O \cdot (Al_{1-0.01-0.0016}B_{0.01}Dy_{0.0008}Nd_{0.0008})_2O_3$ which emits violet light, and $(Sr_{0.7996}Ca_{0.1999}Eu_{0.0005})Al_2O_4 \cdot (Sr_{0.7996}Ca_{0.1999}Eu_{0.0005})O \cdot (Al_{1-0.02-0.002}B_{0.02}Dy_{0.002})_2O_3$ which emits yellow light.

7. The high luminance luminous fiber according to claim 1 wherein the polyolefin resin is a polypropylene resin having a melt flow rate of 5–50 g/10 min.

8. A process for producing a high luminance luminous fiber comprising the steps of:

providing, as a core component, a composition containing a polyolefin resin and 10–60% by weight, relative to the core component, of a luminous pigment comprising sintered fine powders represented by the formula $(M_{0.9995-0.998}Eu_{0.0005-0.002})Al_2O_4 \cdot (M_{0.9995-0.998}Eu_{0.0005-0.002})O \cdot n(Al_{1-b-a}B_bQ_a)_2O_3$, wherein M represents at least one element selected from the group consisting of Sr, Ca, Mg and Ba; Q represents at least one element selected from the group consisting of La, Ce, Pr, Nd, Sm, Gd, Tb, Dy, Ho, Er, Tm, Yb, Y, Lu, Mn and Bi; a falls within the range of 0.0005–0.002; b falls within the range of 0.001–0.35; and n is an integer of 1–8;

providing, as a sheath component, a polyolefin resin containing no luminous pigment; and conjugate spinning the core component and the sheath component.

9. The process according to claim 8, further including the step of, after the conjugate spinning step, drawing the fiber under the conditions of a draw ratio of 2–5, a drawing temperature of 60–110° C. and a heat set temperature of 90–150° C.

10. The process according to claim 9, further including the step of, after the drawing step, subjecting the fiber formed in the drawing step to an draw-stuffer jet crimper process at a heat treating temperature of 110–150° C. and a relaxation percentage of 20% or more.

* * * * *